United States Patent
Hiraga et al.

[15] 3,689,564
[45] Sept. 5, 1972

[54] STEROIDS INTERMEDIATES HAVING A 17A-HYDROXY-13-HYDROCARBON SUBSTITUTED 8,14-SECOGONA-1,3,5(10),9,15-PENTAEN-14-ONE NUCLEUS

[72] Inventors: Kentaro Hiraga, Ikeda; Tsunehiko Asako, Suita; Takuichi Miki, Amagasaki, all of Japan

[73] Assignee: Takeda Chemical Industries, Ltd., Osaka, Japan

[22] Filed: March 21, 1968

[21] Appl. No.: 714,772

[30] Foreign Application Priority Data

March 24, 1967 Japan .....................42/18327
March 24, 1967 Japan .....................42/18328

[52] U.S. Cl. ............260/590, 260/295.5, 260/346.2, 260/396, 260/488, 260/570.5, 260/571, 260/586, 260/586 H, 260/617.5
[51] Int. Cl. .............................................C07c 49/82
[58] Field of Search.....................................260/590

[56] References Cited

OTHER PUBLICATIONS

Djerassi, Steroid Reactions, 148–149 (1963)

*Primary Examiner*—Daniel D. Horwitz
*Attorney*—Wenderoth, Lind & Ponack

[57] ABSTRACT

A process is described for preparing a compound having a 13-hydrocarbon substituted-gona-1,3,5(10),8,14-pentaen-17α-ol nucleus from a compound having a 17α-hydroxy-13-hydrocarbon substituted-8,14-secogona-1,3,5(10),9,15-pentaen-14-one nucleus via a compound having a 13α-hydrocarbon substituted-9,14-oxido-8,14-secogona-1,3,5(10),15-tetraen-17-one nucleus and a compound having a 13α-hydrocarbon substituted-9,14-oxido-8,14-secogona-1,3,5(10)-trien-17-one nucleus. A process is also described for preparing the compound having the 17α-hydroxy-13-hydrocarbon substituted 8,14-secogona-1,3,5(10),9,15-pentaen-14-one nucleus from a 13-hydrocarbon substituted-8,14-secogona-1,3,5(10),9,15-pentaene-14,17-dione by Meerwein-Ponndorf-Verley reduction. Novel intermediates for preparing known compounds of known utility by per se known methods are disclosed.

2 Claims, No Drawings

STEROIDS INTERMEDIATES HAVING A 17A-HYDROXY-13-HYDROCARBON SUBSTITUTED 8,14-SECOGONA-1,3,5(10),9,15-PENTAEN-14-ONE NUCLEUS

The present invention relates to a novel process for producing a compound having a 13-hydrocarbon substituted-gona-1,3,5(10), 8,14-pentaen-17α-ol nucleus, employing as the starting material a compound having a 17α-hydroxy-13-hydrocarbon substituted-8,14-secogona-1,3,5(10), 9,15-pentaen-14-one nucleus, of which cyclization to form the steroidal skeleton having a natural configuration cannot be performed under such known conditions as described in Chemistry and Industry, July 30, 1966, pp. 1,340–1,341.

The principal object of this invention is to embody a process for producing a compound having a 13-hydrocarbon substituted-gona-1,3,5(10), 8,14-pentaen-17α-ol nucleus, employing as the starting material a compound having a 17α-hydroxy-13-hydrocarbon-substituted-8,14-secogona-1,3,5(10),9,15-pentaen-14-one nucleus.

Another object of this invention is to provide novel compounds having a 17α-hydroxy-13-hydrocarbon substituted-8,14-secogona-1,3,5(10),9,15-pentaen-14-one nucleus and novel compounds having a 13α-hydrocarbon substituted-8,14-oxido-8,14-secogona-1,3,5(10), 15-tetraen-17-one nucleus.

Other objects will become apparent from the detailed description hereinafter provided.

Compounds having a 17α-hydroxy-13β-hydrocarbon substituted-8,14-secogona-1,3,5(10),9,15-pentaen-14-one nucleus (IV)

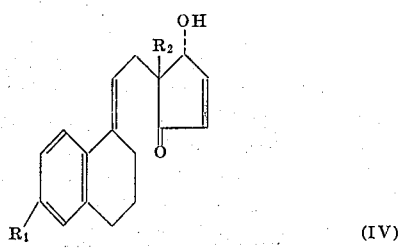

(IV)

used as the starting materials of the present invention, are prepared, for example, by subjecting corresponding compounds having a 13-hydrocarbon substituted-8,14-secogona-1,3,5(10),9,15-pentaene-14,17-dione nucleus (III)

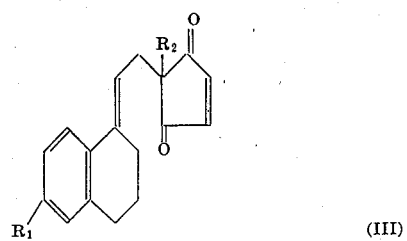

(III)

to Meerwein-Ponndorf-Verley reduction employing aluminum alkoxide (e.g. aluminum isopropoxide, aluminum phenoxide, etc.) in a solvent generally used for a steroidal reaction (e.g. methanol, ethanol, isopropanol, butanol, tetrahydrofuran, dioxane, ether, petroleum ether, chloroform, benzene, toluene, etc.) at a temperature of −60°C to 85°C, or by subjecting the same compound to a biological selective reduction employing a microorganism of the genus Kloeckera (e.g. *Kloeckera magna*, etc.).

The above-mentioned compound having a 13-hydrocarbon substituted-8,14-secogona-1,3,5(10),9,15-pentaene-14,17-dione nucleus (III) is prepared by, for example, a condensation reaction between a compound having a 4-hydroxy or 4-acyloxy-2-hydrocarbon substituted-cyclopentane-1,3-dione nucleus (I) and a compound having a 1-hydroxy-1-vinyl-tetra line nucleus or S-2-(1'-tetraliden)ethylthiuronium nucleus (II) to give a compound having a 8,14-secogona-1,3,5(10),9,15-pentaen-14,17-dione nucleus (III) optionally in the presence of a basic catalyst. The expression "compound having a 4-hydroxy- or 4-acyloxy-2-substituted cyclopentane-1,3-dione nucleus" refers to a compound (I) which has the general structure represented by the formula

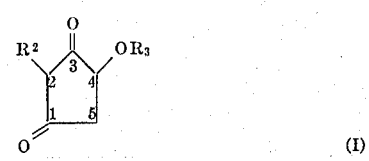

(I)

wherein $R^2$ is a hydrocarbon residue, which is exemplified by lower alkyl (e.g. methyl, ethyl, n-propyl, isopropyl, n-butyl, isobutyl and tertiary butyl), phenyl and benzyl, and wherein $R^3$ is a hydrogen atom or an acyl radical derived from a carboxylic acid e.g. acetyl, propionyl, butyryl, benzoyl, ethoxycarbonyl, etc.). One of the hydrogen atoms at the position 5 of the compound (I) can further be replaced by a hydrocarbon residue as exemplified above. By "compounds having the 1-hydroxy-1- -vinyl-tetraline nucleus or S-2-(1'-tetralidene)ethylthiuronium nucleus" are meant compounds of the general structure represented by the formulas

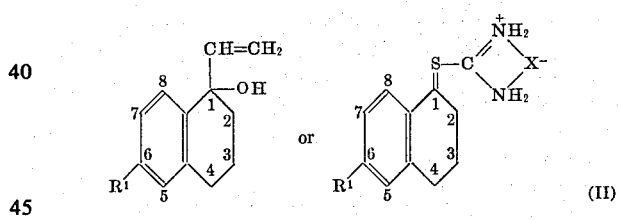

(II)

wherein $R^1$ is a hydrogen atom, hydroxyl, an etherified hydroxyl radical (e.g. methoxy, ethoxy, benzyloxy, etc.), or an esterified hydroxyl radical (e.g. acetyloxy, nicotinoyloxy, etc.), and wherein X is a lower acyloxy or lower alkylcarbonyloxy radical (e.g. acetyloxy, propionyloxy, etc.), a halogen ion (e.g. chloride, bromide), the perchloro radical, the sulfate radical, etc., and which compounds can be substituted, for example, at one or more of the positions 3, 4, 5, 7 and 8 in the tetrahydronaphthalene skeleton, by a hydrocarbon residue such as lower alkyl (e.g. methyl, ethyl, n-propyl, isopropyl, n-butyl and isobutyl), phenyl or benzyl, and/or, at one or more of the positions 5, 7 and 8 in the skeleton, by a hydroxyl group, an etherified hydroxyl or lower alkoxy group (e.g. methoxy, ethoxy, n-propoxy and n-butoxy), and esterified hydroxyl group (e.g. acetoxy, propionyloxy and benzoyloxy), a halogen atom (e.g. fluorine and chlorine), a thio group (e.g. mercapto, methylthio, ethylthio and acetylthio) and an acyl group derived from a carboxylic acid (e.g. acetyl, propionyl and benzoyl).

The thus-obtained compound having a 17α-hydroxy 13-substituted-8,14-secogona-1,3,5(10), 9-tetraen-14-one nucleus (IV), the starting material of the present invention is exemplified as follows:

17α-Hydroxy-13β-methyl-8,14-secogona-1,3,5(10),9-tetraen-14-one;

17α-Hydroxy-13β-methyl-3-methoxy-8,14-secogona-1,3,5(10) 9-tetraen-14-one;

17α-Hydroxy-13β-methyl-3-ethoxy-8,14-secongona-1,3,5(10),br9-tetraen-14-one;

17α-Hydroxy-13β-ethyl-8,14-secogona-1,3,5(10),9-tetraen-14-one;

17α-Hydroxy-13β-isopropyl-8,14-secogona-1,3,5(10), 9-tetraen-14-one;

17α-Hydroxy-3-methoxy-13β-ethyl-8,14-secogona-1,3,5-(10),9-tetraen-14-one;

17α-Hydroxy-3-methoxy-13β-n-propyl-8,14-secogona-1,3,5,(10),9-tetraen-14-one;

17α-Hydroxy-3-methoxy-13β-isopropyl-8,14-secogona-1,3,5(10),9-tetraen-14-one; etc.

The first step of the present invention comprises contacting the compound having a 13β-hydrocarbon substituted-8,14-secogona-tetraen-17β-ol nucleus (IV) with acid catalyst, whereupon intramolecular cyclization takes place to give a compound having a 13α-hydrocarbon substituted-9,14-oxido-8,14-secogona-1,3,5(10), 15-tetraen-17-one nucleus:

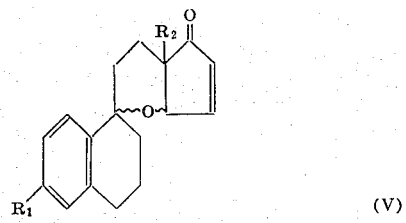

(V)

The acid catalyst is exemplified by inorganic acids or their anhydrides (e.g. hydrochloric acid, sulfuric acid, phosphoric acid, phosphorus pentoxide and polyphosphoric acid), partial salts or partial esters of the polybasic inorganic acids (e.g. sodium hydrogen sulfate, monosodium dihydrogen phosphate and monomethyl sulfate), their pyridine complexes (e.g. pyridine-hydrobromic acid complex), sulfonic acids (e.g. methane-sulfonic acid, ethanesulfonic acid, benzenesulfonic acid and toluenesulfonic acid), sulfonated styrene-type cation exchange resins, so-called Lewis acids (e.g. aluminum chloride, boron trifluoride and tin chloride), silica gel, etc. This reaction does not require any solvent. However, the reaction can be effected more smoothly in a suitable solvent such e.g. as benzene, toluene, xylene, tetrahydrofuran, dibutyl ether, methanol, ethanol and propanol. This reaction is accelerated by heating e.g. to a temperature in the neighborhood of 100°C or higher.

The thus-obtained compound having a 13α-hydrocarbon substituted 9,14-oxido-8,14-secogona-1,3,5(10),15-tetraen-17-one nucleus (V) is subjected to partial reduction by so-called catalytic reduction. For this purpose, Raney nickel or palladium catalyst is advantageously used. The reaction can be carried out in a suitable solvent which is exemplified by dioxane, tetrahydrofuran, ether, methanol, ethanol and acetic acid. The reaction usually takes place at ambient temperature (e.g. at about 15° to 30°C); but, if required, it can be carried out at an elevated or lowered temperature. In any event, too drastic conditions should be avoided for this reaction, since there may take place hydrogenolysis at position 9.

The thus-obtained compound having a 13α-hydrocarbon substituted-9,14-oxido-8,14-secogona-1,3,5(10)-trien-17-one nucleus

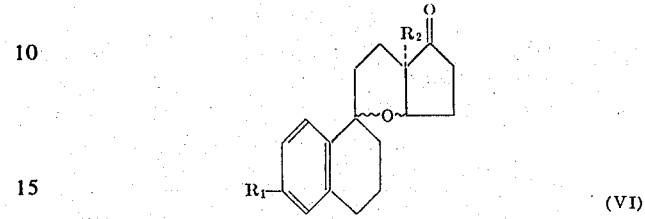

(VI)

is finally brought into contact with acid catalyst to produce a compound having a 13α-substituted-gona-1,3,5(10),8,14-pentaen-17α-ol nucleus

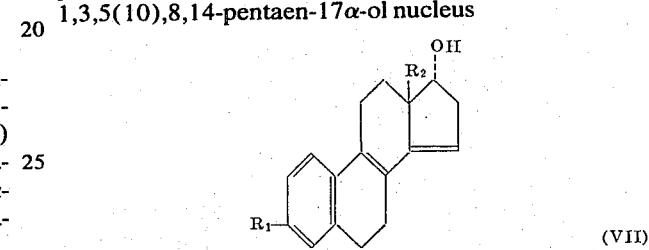

(VII)

9,14-oxido-8,14 This reaction can be carried out under the same conditions as employed in the process for preparing a compound having a 13α-hydrocarbon substituted-9,14-secogona-1,3,5(10), 15-tetraen-17-one nucleus (V) from the compound having a 13α-hydrocarbon substituted-8,14-secogona-1,3,5(10),9,15-pentaen-14-one 17α-ol nucleus (IV).

The thus obtained 13β-substituted -17α-hydroxygona-pentaene

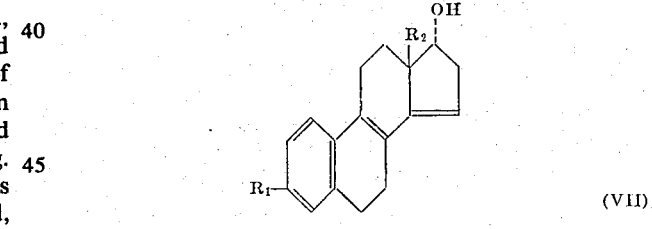

(VII)

can be converted steroselectively and exclusively to the corresponding 13β-substituted gona-1,3,5(10), 8-tetraen-17α-ol

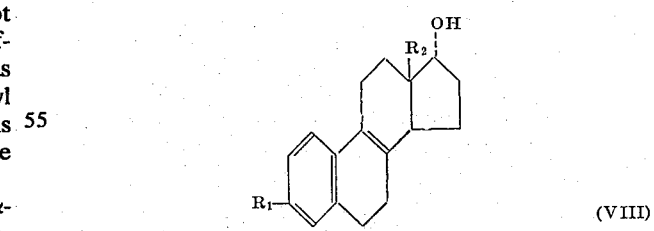

(VIII)

in which the hydrogen attached to the position 14 is oriented to α-configuration; that is, the same configuration as estro-genic steroids obtained from natural sources. The 13β-substituted -17α-hydroxy-gona-tetraenes (VIII) can further be converted by reduction to produce, with a good overall yield, the 13β-substituted-gona-1,3,5(10)-trien-17α-ols (IX) and the 13β-substituted-gona-2,5(10)-dien-17α-ols (XI)

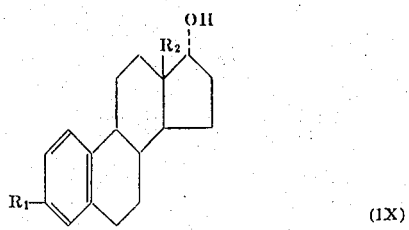

(IX)

which compounds (IX and XI) are easily converted by oxidation to 13β-substituted-gona-1,3,5(10)-trien-17-ones

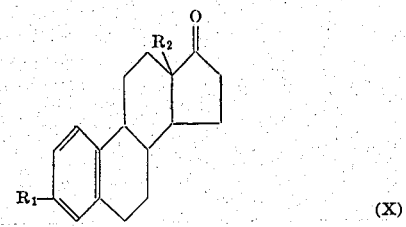

(X)

and 13β-substituted-gona-2,5(10)-dien-17-ones

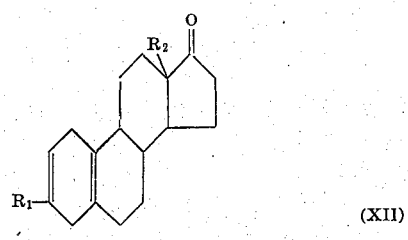

(XII)

respectively, both compounds having the natural hydrogen configuration at the 8, 9 and 14-positions.

The conversion of compounds (VII) to compounds (VIII) is conveniently effected by so-called catalytic reduction. For this purpose, Raney nickel or palladium catalyst is advantageously used. The reaction can be carried out in a suitable solvent which is exemplified by dioxane, tetrahydrofuran, ether, methanol, ethanol and acetic acid. The reaction usually takes place at ambient temperature, but, if required, it can be carried out at an elevated or lowered temperature. If desired, more drastic conditions are employed to obtain further hydrogenated product at the positions 8 and 9, in which the hydrogen at the 8-position is in opposite configuration to that of the natural type steroids.

The reduction of compounds (VIII) to compounds (IX) is advantageously carried out by allowing an alkali metal to react with compounds (VIII) in liquid ammonia. The alkali metal may be lithium, sodium or potassium, for example. The reaction is carried out in liquid ammonia or a mixture thereof with an inert solvent, for example, ether, dioxane and tetrahydrofuran. Since reaction conditions are rather violent, the reaction is usually brought about at a lower temperature, i.e. below ambient temperature to about −30°C. The reduction of compounds (IX) to compounds (XI) is advantageously carried out by allowing an alkali metal to react with the compounds (IX) in liquid ammonia containing a proton source such as an alcohol having up to six carbon atoms (e.g. methanol, ethanol, tertiary-butanol, etc.), other conditions being the same as above. In the same manner as this reaction, a compound having a 13-substituted-1,3,5(10),8-tetraen-17-ol nucleus (VIII) can also be converted to the same produce (XI), saturating the double bond at the position 8 as well as a double bond at the aromatic ring. The thus-obtained trienol (IX) or dienol (XI) can be respectively subjected to so-called Oppenauer oxidation employing aluminum isopropoxide, aluminum ethoxide, aluminum phenoxide, pyridine-chromic acid anhydride, etc., to oxidation employing pyridine-chromic acid anhydride or dimethylsulfoxide-dicyclohexylcarbodiimide, to oxidation employing microorganisms, etc., to produce a compound having a 13-substituted-gona-trien-17-one nucleus (X) or to produce a compound having a 13-substituted-gona dien-17-one nucleus (XII) respectively, both having the same configuration as estrogenic steroids obtained from natural sources.

The foregoing reactions proceed irrespective of optically active or inactive compounds employed as the starting materials.

It is to be understood that the following exemplifications are solely for the purpose of illustration and are not to be construed as limitations of this invention, and that minor variations may be resorted to without departing from the spirit and scope of this invention. In the following, "g." and "ml." are "gram(s)" and "milliliter(s)", respectively. Temperatures are all uncorrected, and percentages are all on the weight basis.

EXAMPLE (1) (±)3-Methoxy-17α-hydroxy-13β-methyl-8,14-secogona-1,3,5(10) 9,15-pentaen-14-one.

To a solution of 0.5 g. of 3-methoxy-8,14-secoestra-1,3,5(10),9,15-pentaene-14,17-dione in 50 ml. of isopropanol, there is added 3 g. of aluminum isopropoxide. The mixture is heated at about 80°C with agitation for one hour while gradually evaporating off acetone (by-product) and isopropanol (solvent). The reaction mixture is added to an aqueous solution of Rochelle salt (sodium potassium tartrate) and the mixture is extracted with ether. The ether layer is washed with water and dried, followed by evaporation of the ether to give 0.5 g. of crystals, which are recrystallized from methanol to obtain 0.35 g. of 3-methoxy-17α-hydroxy-8,14-secoestra-1,3,5(10),9,15-pentaen-14-one melting at 114.5° to 115°C.

Elementary analysis:
Calculated for $C_{19}H_{22}O_3$; C, 76.48; H, 7.43
Found C, 76.57; H, 7.51

Infrared absorption:

$\mu_{max}^{Nujol}$ cm.$^{-1}$:3320, 1687, 1617, 1500, 1241

Ultraviolet absorption:

$\lambda_{max}^{ethanol}$ m$\mu$ ($\epsilon$): 265 (17,800)

Nuclear magnetic resonance spectrum:
($\delta$, $CDCl_3$)
1.12 (singlet 3H, $C_{13}$—$CH_3$)
3.66 (singlet 3H, —$OCH_3$)
4.08 (doublet 1H, $C_{17}$—H)
5.70 (triplet J=7cps 1H, $C_{11}$—H)
6.10 (multiplet 1H, $C_{15}$—H)
6.4–7.5 (multiplet 4H, aromatic ring and $C_{16}$—H)

(2) (±) 3-Methoxy-13α-methyl-9,14-oxido-8,14-secogona-1,3,5(10),15-tetraen-17-one.

To a solution of 0.2 g. of (±)3-methoxy-17α-hydroxy-13β-methyl-8,14-secogona-1,3,5(10),9,15-pentaen-14-one in 10 ml. of dried benzene is added 1 ml. of saturated benzene solution of para-toluenesulfonic acid and the mixture is stirred for one hour at room temperature (about 15° to about 50°C). The reaction solution is poured into water and the mixture is extracted with ether. The ether layer is washed with a 5 percent aqueous solution of sodium hydrogencarbonate and water. After being dried, the washed ether layer is subjected to evaporation of the ether, and the residue is subjected to column chromatography on silica gel employing a mixed solvent of benzene and ethyl acetate (19:1) to give 0.18 g. of (±)3-methoxy-13α-methyl-9,14-oxido-8,14-secogona-1,3,5(10), 15-tetraen-17-one as oily substance.
Infrared absorption:

$$\mu_{max}^{liquid}\ cm.^{-1}: 1714, 1610, 1502.$$

No absorption of hydroxyl radical is observed.
Ultraviolet absorption:

$$\lambda_{max}^{ethanol}\ m\mu(\epsilon);\ 275.5(4,410),\ 283(3,870)$$

(3) (±)3-Methoxy-13α-methyl-9,14oxido-8,14-secogona-1,3,5(10)-trien-17-one.

A solution of 0.15 g. of (±)3-methoxy-13α-methyl-9,14-oxido-8,14-secogona-1,3,5(10),15-tetraen-17-one in 20 ml. of ethanol is shaken in hydrogen gas stream in the presence of 0.08 g. of Raney nickel until about 20 ml. of hydrogen gas is absorbed. The catalyst is filtered off from the reaction mixture and the filtrate is condensed to obtain 0.14 g. of (±)3-methoxy-13α-methyl-9,14-oxido-8,14-secogona-1,3,5(10)-trien-17-one as oily substance.
Infrared absorption:

$$\mu_{max}^{liquid}\ cm.^{-1};\ 1735,\ 1608,\ 1498.$$

(4) (±)3-methoxy-13β-methylgona-1,3,5(10),8,14-pentaen-17α-ol.

To a solution of 0.14 g. of (±)3-methoxy-13α-methyl-9,14-oxido-8,14-secogona-1,3,5(10)-trien-17-one in 10 ml. of methanol, there is added 5 ml. of concentrated hydrochloric acid. The mixture is refluxed for a while. The reaction mixture is poured into water, and the resulting mixture is extracted with ether. The ether layer is washed with an aqueous solution of sodium hydrogencarbonate and with water, followed by evaporating off the solvents to obtain 0.12 g. of (±)3-methoxy-13β-methylgona-1,3,5(10),8,14-pentaen-17α-ol melting at 98° to 101°C, which is identified with an authentic sample by mixed melting point examination and other chemical and physical test.

In analogous manner, any of the other hereinmentioned starting materials can be converted into objective compounds in accordance with the following reaction chart:

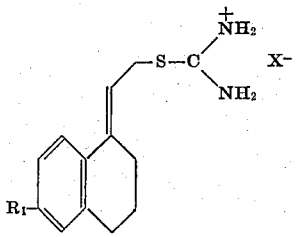

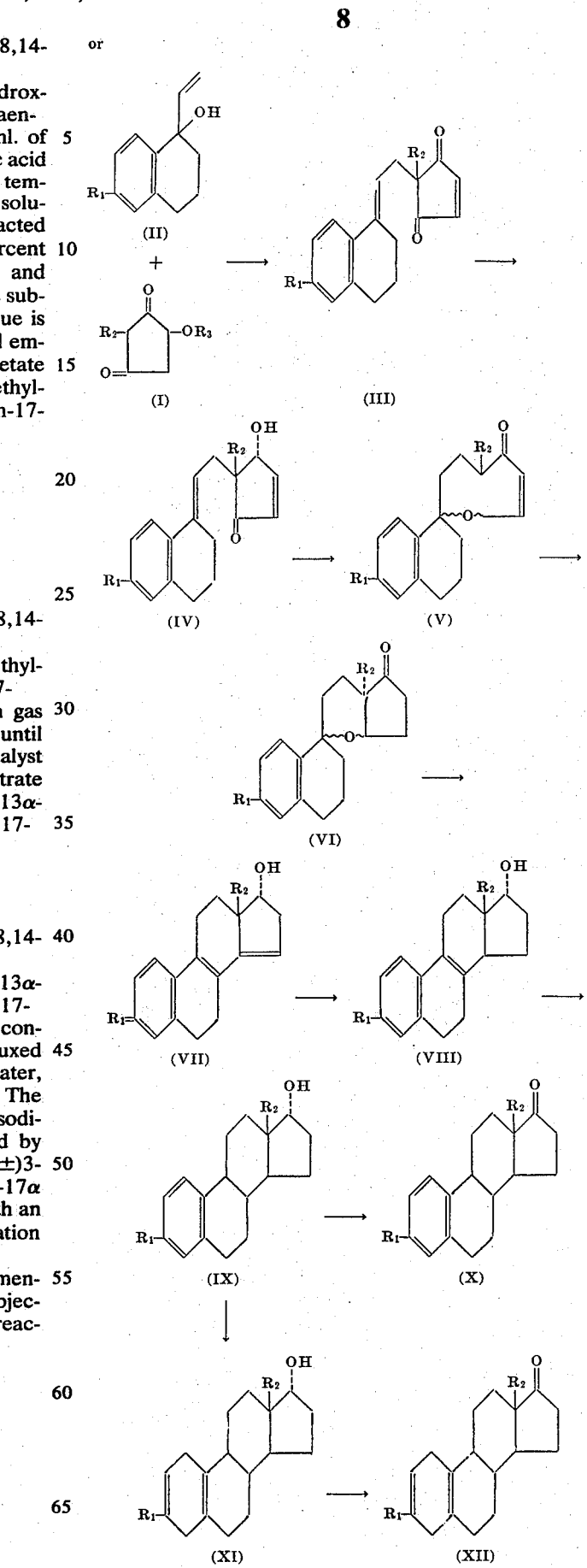

Having thus disclosed the invention, we claim:

1. The compound 3-lower alkoxy-17α-hydroxy-13β-lower alkyl-8,14-secogona-1,3,5(10),9,15-pentaen-14-one.

2. A compound according to claim 1, namely, 3-Methoxy-17α-hydroxy-13β-methyl-8,14-secogona-1,3,5,(10),9,15-pentaen-14-one.

* * * * *